March 23, 1965  H. B. BRITT  3,174,340
THERMOCOUPLE AND THERMOMETER WELL
Filed Dec. 19, 1960

INVENTOR.
Howard B. Britt

BY  *C. F. Bryant*
ATTORNEY

United States Patent Office 3,174,340
Patented Mar. 23, 1965

3,174,340
THERMOCOUPLE AND THERMOMETER WELL
Howard B. Britt, Simsbury, Conn., assignor to Combustion Engineering, Inc., Windsor, Conn., a corporation of Delaware
Filed Dec. 19, 1960, Ser. No. 76,811
3 Claims. (Cl. 73—343)

This invention relates to a thermometer or thermocouple well to be secured in a large pipe or other container housing fluids under extremely high pressures and temperatures.

In certain installations, particularly in large modern steam generating units, high pressure and high temperature fluids are utilized, the temperature being on the order of 1050° F., and the pressure exceeding 2500 p.s.i. These fluids are circulated through the piping at velocities exceeding 150 feet per second. In such an installation many of the controls, such as used to control desuperheating water valves, flue gas recirculating dampers, etc., operate in response to the temperature of the fluids in the various pipes, ducts, headers, and other fluid containers present in the steam generating unit. Main steam pipes and headers are now exceeding bores of twelve inches, and reheat steam pipes and headers are now exceeding bores of twenty inches. Existing thermocouple and thermometer wells limit penetration of the thermocouple or thermometer to a depth of from four to six inches into the pipe or header. This is because of the extremely high pressures, temperatures and flow velocities the well must be able to withstand, and the need for minimum wall thicknesses to permit efficient heat transfer.

Frequently the only locations available or practical for installation of the wells into the pipes or headers are in areas where the mixture of fluid is not homogeneous and consequently samples being measured by a thermometer in a six-inch deep well mounted in a twenty-inch diameter pipe may vary considerably from the true average temperature. A true average temperature can only be ascertained by mounting a thermometer or thermocouple in the pipe such that it extends substantially entirely across the width or height of the pipe, thereby giving an indication of the temperature of the fluid at a plurality of points, from which a true average temperature can be calculated or determined.

It is an object of this invention to design and construct a thermometer or thermocouple well which extends across the full diameter of the pipe, header, or container bore, and will be suitably supported at both ends in the pipe wall. Such a construction will be more rigid than present wells secured only at one end, and the walls of the well can thus be made thinner. By making the walls of the well thinner, the thermometer or thermocouple housed therein will respond much faster and will give a truer indication of any temperature changes in the steam or other fluid within the pipe or header.

A further object of the invention is to mount the well within the pipe in such a manner that the well is free to move, with respect to the pipe, due to thermal expansion. This is accomplished by fixedly securing one end of the well to the pipe wall, and supporting the other end of the well in the pipe wall by means of an expansion joint or connection. Such support of the well at both ends eliminates vibration, and permits thinning of the well wall, thereby improving the response and accuracy of the thermometer or other measuring device.

Additional objects and advantages will become more apparent as reference is had to the accompanying drawing wherein.

Figure 1:
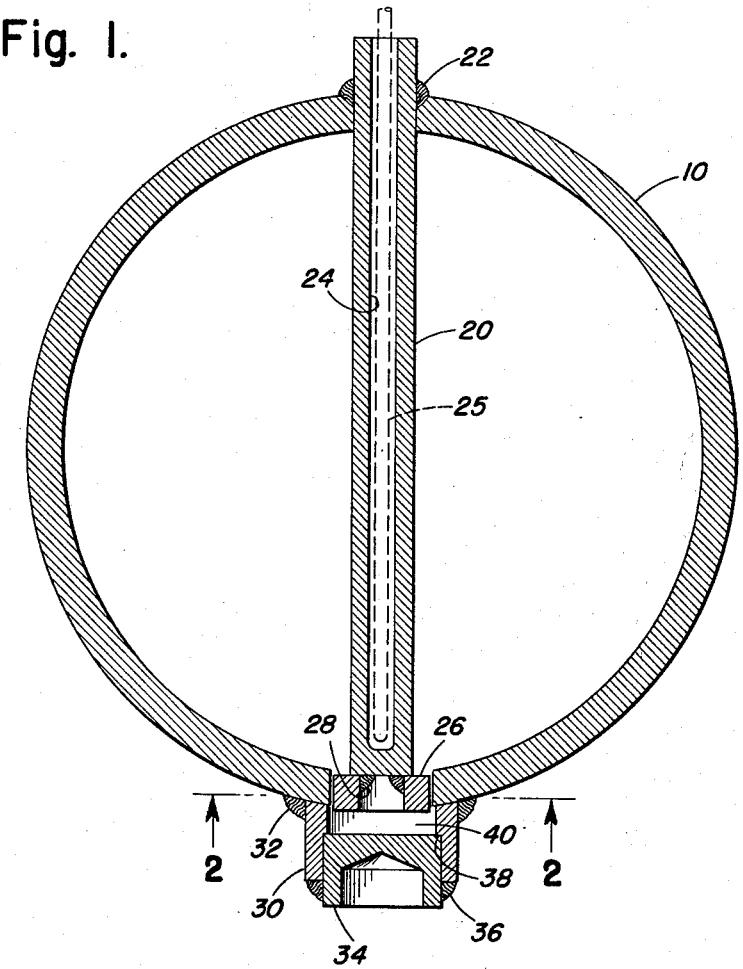
FIGURE 1 is a cross-sectional view of a pipe or header containing my improved thermometer or thermocouple well.

Looking now to FIGURE 1, 10 designates a pipe, duct, header, or other container enclosing a fluid such as steam under high pressure and high temperature. Mounted in pipe 10 is a thermometer or thermocouple well 20, having a central passage or bore 24 suitable for housing a thermometer or thermocouple assembly 25, shown in dotted lines in the figure. As clearly shown by the illustration, the thermometer or thermocouple assembly extends entirely across the bore of the pipe, and by utilizing a long resistance thermometer or a multiple thermocouple, it is possible to take a plurality of temperature readings, thereby enabling a true average to be determined. This average temperature can be automatically computed or determined by an instrument mounted with the thermometer or thermocouple, and this average temperature can be indicated and/or recorded and/or transmitted to a suitable controller in a control system which will effect a change in the temperature of the fluid being measured.

Figure 2:
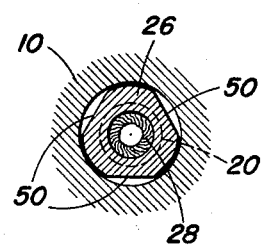
FIGURE 2 is an end view of the construction of the lower end of the well of FIGURE 1.

The upper end of well 20 is fixedly secured to pipe 10 by means of weld 22. It is preferred that pipe 10 and well 20 be made of the same or a compatible material, and welded with a compatible welding rod, so that a homogeneous weld is formed which will be of substantial strength to prevent cracking of the weld due to thermal expansion at the joint. The lower end of the well 20 is formed by securing an annular ring 26 onto the well 20 by means of weld 28. This annular ring 26 slidingly fits into a bore or hole cut in the wall of pipe 10. In the embodiment illustrated, the opening in the pipe is closed by means of member 30, and member 34, which rests on the inner annular flange 38 on member 30. Member 30 is sealingly secured to pipe 10 and member 34, by means of welds 32 and 36, respectively. The bore formed in the wall of pipe 10 is of such a depth that well 20, due to thermal expansion, can freely move up and down, as illustrated. Area 40 between annular ring 26 and the inner end of member 34 is for this purpose. As best seen in FIGURE 2, a plurality of flat edges 50, three of which are shown, are formed on the outer circumference of ring 26, to insure a free sliding fit in the bore in pipe 10, to thereby prevent any tendency of its becoming jammed or wedged tightly within the bore or from trapping any fluid in the void area 40. It is obvious that the plurality of flat surfaces or portions machined on the annular ring 26 can be machined directly onto the bottom of the well when strength and machining considerations permit, thus eliminating the need for the separate annular ring 26.

As illustrated, the thermometer or thermocouple should be in very close proximity to the walls of well 20, and should actually be in contact therewith a some points so that temperature changes in the fluid within the pipe 10 are rapidly transmitted to the temperature sending instrument 25. The thinner the walls of well 20 are, and the closer the contact between the temperature sensing instrument 25 and the well 20, the more rapid the heat transfer therethrough will be. Mounting the well so as to be supported at both ends, as shown, enables a more rigid assembly, and hence the walls can be made thinner. This also makes the well more economical to manufacture. Also, by extending the well through the entire flow path within pipe 10, truer average of the temperature can be obtained by sensing the temperature at a plurality of points. The floating end of the well provides sufficient freedom of movement to allow for differential expansion between the well and the pipe.

While the preferred embodiment has been shown and described, it will be understood that such is merely illustrative and not restrictive.

What I claim is:

1. In combination, a container for housing high pressure and high temperature fluids, a well adapted to house a thermometer or thermocouple extending into said container, said well having a central passage open at one end and closed at its other end, the open end of said well being fixedly secured to a wall of said container, a bore formed in another wall of said container opposite the point at which the open end is fixedly secured, the closed end of said well slidingly extending into the bore, said bore being of a great enough depth such that the closed end of said well is free to move up and down in the bore due to thermal expansion caused by the high temperature fluids within said container, the walls of the bore being in such close proximity to the closed end of said well that the closed end of said well is prevented from moving laterally.

2. In combination, a pipe containing a high pressure and high temperature fluid, a well extending into said pipe, said well having a passage open at one end and closed at its other end, the open end of said well being welded to a wall of said pipe, a bore formed in another wall of said pipe opposite the point at which the open end is welded, the closed end of said well slidingly extending into the bore, said bore being of a great enough depth such that the closed end of said well is free to move up and down in the bore due to thermal expansion caused by the high temperature fluids within said bore, the walls of the bore being in such close proximity to the closed end of said well that the closed end of said well is prevented from moving laterally, a temperature sensing instrument housed within the well, said temperature sensing instrument extending throughout the entire length of the passage in said well.

3. The combination set forth in claim 2, said well and said pipe being made of a compatible material, such that the weld therebetween will not break due to thermal expansion.

References Cited in the file of this patent

UNITED STATES PATENTS

| | | |
|---|---|---|
| 1,455,663 | Robertshaw et al. | May 15, 1923 |
| 2,263,388 | Keller | Nov. 18, 1941 |
| 2,277,276 | Thomas | Mar. 24, 1942 |
| 2,560,455 | Knight | July 10, 1951 |
| 2,756,596 | Nelson | July 31, 1956 |
| 2,838,935 | Di Cecio et al. | June 17, 1958 |